(12) United States Patent
O'Neil et al.

(10) Patent No.: US 12,322,827 B2
(45) Date of Patent: Jun. 3, 2025

(54) DISTRIBUTION SYSTEM FOR UNSWITCHED HIGH VOLTAGE POWER

(71) Applicant: Rivian IP Holdings, LLC, Irvine, CA (US)

(72) Inventors: Kyle O'Neil, Los Angeles, CA (US); Ehsan Baseri, Irvine, CA (US); Kyle Butterfield, Ladera Ranch, CA (US); Nathaniel C. Wynn, Newport Beach, CA (US); Tyler Collins, Irvine, CA (US); Todd Putnam, Laguna Beach, CA (US); Vignesh Sekar, Canton, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 536 days.

(21) Appl. No.: 17/696,064

(22) Filed: Mar. 16, 2022

(65) Prior Publication Data
US 2022/0209358 A1 Jun. 30, 2022

Related U.S. Application Data

(63) Continuation of application No. 16/680,267, filed on Nov. 11, 2019, now Pat. No. 11,289,766.
(Continued)

(51) Int. Cl.
*H01M 50/296* (2021.01)
*H01M 10/42* (2006.01)
(Continued)

(52) U.S. Cl.
CPC ....... *H01M 50/296* (2021.01); *H01M 10/425* (2013.01); *H01M 50/204* (2021.01);
(Continued)

(58) Field of Classification Search
None
See application file for complete search history.

(56) References Cited

U.S. PATENT DOCUMENTS

| | | | |
|---|---|---|---|
| 11,381,072 | B2 | 7/2022 | Putnam et al. |
| 11,677,232 | B2 | 6/2023 | Putnam et al. |

(Continued)

FOREIGN PATENT DOCUMENTS

| | | | |
|---|---|---|---|
| CN | 101356707 | A | 1/2009 |
| CN | 101606272 | A | 12/2009 |

(Continued)

OTHER PUBLICATIONS

U.S. Appl. No. 18/142,935, filed May 3, 2023, Todd Putnam.
(Continued)

*Primary Examiner* — Gregg Cantelmo
(74) *Attorney, Agent, or Firm* — Haley Guiliano LLP

(57) ABSTRACT

A battery enclosure is provided having unswitched positive and negative terminals that are physically separated. The unswitched positive and negative terminals may be connected to circuit protection components, such as contactors and fuses. The contactors are set to an opened or closed state via a contactor control module. The battery enclosure includes external terminals that electrically couple the battery and circuit protection devices to external components, such as charging ports and electrical loads.

20 Claims, 5 Drawing Sheets

Related U.S. Application Data

(60) Provisional application No. 62/760,757, filed on Nov. 13, 2018.

(51) Int. Cl.
    *H01M 50/204*    (2021.01)
    *H01M 50/209*    (2021.01)
    *H01M 50/242*    (2021.01)
    *H01M 50/249*    (2021.01)
    *H01M 50/298*    (2021.01)
    *H01M 50/507*    (2021.01)
    *H01M 50/51*    (2021.01)
    *H01M 50/583*    (2021.01)

(52) U.S. Cl.
CPC ....... *H01M 50/209* (2021.01); *H01M 50/249* (2021.01); *H01M 50/298* (2021.01); *H01M 50/507* (2021.01); *H01M 50/51* (2021.01); *H01M 50/583* (2021.01); *H01M 50/242* (2021.01); *H01M 2220/20* (2013.01)

(56) References Cited

U.S. PATENT DOCUMENTS

| | | | |
|---|---|---|---|
| 11,984,719 | B2 | 5/2024 | Putnam et al. |
| 2003/0025480 | A1 | 2/2003 | Pannwitz |
| 2007/0141457 | A1 | 6/2007 | Amagai |
| 2011/0012435 | A1 | 1/2011 | Cohen et al. |
| 2011/0080139 | A1* | 4/2011 | Troxel ................ H01M 10/441 320/136 |
| 2012/0274143 | A1* | 11/2012 | Arakawa ............... H01M 10/46 307/80 |
| 2013/0106356 | A1* | 5/2013 | Nakao .................. H01M 10/48 320/118 |
| 2013/0181681 | A1 | 7/2013 | Mukai et al. |
| 2013/0249492 | A1* | 9/2013 | Kim ..................... H01M 10/48 320/128 |
| 2013/0337294 | A1* | 12/2013 | Achhammer ......... H01M 10/46 429/61 |
| 2015/0244165 | A1 | 8/2015 | Roesner et al. |
| 2015/0371803 | A1 | 12/2015 | Hosomizo et al. |
| 2016/0036220 | A1 | 2/2016 | Lacaux et al. |
| 2016/0099459 | A1 | 4/2016 | Doornekamp |
| 2017/0001584 | A1 | 1/2017 | Harris et al. |
| 2017/0074252 | A1 | 3/2017 | Madigan et al. |
| 2017/0200926 | A1 | 7/2017 | Motokawa et al. |
| 2019/0140245 | A1 | 5/2019 | Mensch et al. |
| 2020/0113072 | A1 | 4/2020 | Oda et al. |
| 2022/0407307 | A1 | 12/2022 | Putnam et al. |

FOREIGN PATENT DOCUMENTS

| | | |
|---|---|---|
| CN | 103204074 A | 7/2013 |
| CN | 105684254 A | 6/2016 |
| CN | 107953787 A | 4/2018 |
| DE | 10137875 C1 | 4/2003 |
| DE | 102012205957 A1 | 10/2013 |
| DE | 102012207669 A1 | 11/2013 |
| DE | 102014200265 A1 | 7/2015 |
| DE | 102014218850 | 3/2016 |
| EP | 1 282 211 | 2/2003 |
| EP | 1 851 841 | 8/2006 |
| JP | 09-284902 A | 10/1997 |
| JP | 2011 010483 | 1/2011 |
| JP | 2011020553 | 2/2011 |
| KR | 20150076913 | 7/2015 |
| WO | 2013/113473 A1 | 8/2013 |
| WO | 2015/099476 A1 | 7/2015 |

OTHER PUBLICATIONS

U.S. Appl. No. 17/854,339, filed Jun. 30, 2022, Todd Putnam.
International Search Report and Written Opinion of PCT/US2019/060762 dated Apr. 2, 2020.

\* cited by examiner

DISTRIBUTION SYSTEM FOR UNSWITCHED HIGH VOLTAGE POWER

CROSS-REFERENCE TO RELATED APPLICATIONS

This application is a continuation of U.S. patent application Ser. No. 16/680,267, filed Nov. 11, 2019, now U.S. Pat. No. 11,289,766, which claims the benefit of U.S. Provisional Application No. 62/760,757, filed Nov. 13, 2018. The entire contents of which are incorporated by reference herein in their entireties.

INTRODUCTION

Electrical vehicles typically include a high power battery system comprising battery cells connected together in a combination of series and parallel connections. In some instances, the battery system is configured to be able to deliver both high current and high voltage to a load, such as a motor in an electric vehicle. Because of the high power, an electrical short across the terminals of the battery system could cause significant damage to both the battery system and/or a load attached to the battery system, and could create a safety risk to people who are near the battery system. Typically fuses are placed in series with an electrical path of the load to interrupt electrical current during an overcurrent event. Oftentimes, the fuses are placed remote from a location of the unswitched terminals of the battery system. Furthermore, a positively charged unswitched terminal of the battery is typically placed in close proximity to a negatively charged unswitched terminal of the battery. Because of the proximity of the unswitched terminals, and the remote location of fuses, during a crash, the risk of a short circuit, and resultant damage to the electrical components or danger to occupants, is high.

SUMMARY

In some embodiments, a battery enclosure is provided. The battery enclosure comprises at least one battery cell, a first contactor, and a second contactor. Each of the at least one battery cell, the first contactor, and the second contactor comprise an unswitched terminal and a switched terminal. The battery enclosure further comprises a first and a second busbar. The first busbar is electrically coupled to the first unswitched terminal of the at least one battery cell and the unswitched terminal of the first contactor. The second busbar is electrically coupled to the second unswitched terminal of the at least one battery cell and the unswitched terminal of the second contactor. The first contactor and the second contactor are physically separated by at least a threshold distance within the battery enclosure. In some embodiments, the threshold distance is at least 450 mm. In some embodiments, the threshold distance is computed based on a dimension of the battery enclosure.

In some embodiments, the battery enclosure further comprises a first fuse having a first fuse terminal and a second fuse terminal. The first fuse terminal is electrically coupled to the first unswitched terminal of the battery and the second fuse terminal is electrically coupled to the unswitched terminal of the first contactor. In some embodiments, the first unswitched terminal of the at least one battery cell has positive polarity and the second unswitched terminal of the at least one battery cell has negative polarity. In some embodiments, an electrical potential across the first unswitched terminal and the second unswitched terminal is at least 300 V.

In some embodiments, the battery enclosure further comprises a first region comprising at least one battery cell, a second region comprising the first contactor, and a third region comprising the second contactor. In such embodiments, the third region and the second region may be physically separated by at least the threshold distance. In some embodiments, the first region and the second region are substantially triangular. In some embodiments, the first region comprises a plurality of fuses.

In some embodiments, the at least one battery cell comprises a plurality of battery cells electrically coupled in series. The first unswitched terminal of the at least one battery cell is electrically coupled to a positive terminal of a first battery cell having a highest electrical potential. The second unswitched terminal of the at least one battery cell is electrically coupled to a negative terminal of the second battery cell having a lowest electrical potential. In some embodiments, a first terminal of a load is electrically coupled to the switched terminal of the first contactor and the second terminal of the load is electrically coupled to the switched terminal of the second contactor. In such embodiments, the electrical load may substantially comprise at least one electric motor of an electric vehicle.

In some embodiments, the battery enclosure comprises a third contactor having a first contactor terminal and a second contactor terminal. The first contactor terminal of the third contactor is electrically coupled to the switched terminal of the first contactor and the second contactor terminal of the third contactor is electrically coupled to a charging port. In such embodiments, the battery enclosure may further comprise a contactor control module configured to control a state of the third contactor, based on detecting an input at the charging port. In some embodiments, the contactor control module controls a state of the first contactor and the second contactor. In some embodiments, the contactor control module maintains a same state for the first contactor and the second contactor.

In some embodiments, the battery enclosure comprises a second fuse. A first fuse terminal of the second fuse and the first fuse terminal of the first fuse are electrically coupled in parallel to the first unswitched terminal of the at least one battery cell. The battery enclosure may further comprise a fourth contactor comprising an unswitched terminal electrically coupled to a second fuse terminal of the second fuse, and a switched terminal electrically coupled to the switched terminal of the first contactor.

In some embodiments, the battery enclosure comprises a fifth contactor. An unswitched terminal of the fifth contactor and the unswitched terminal of the second contactor are electrically coupled in parallel to the second unswitched terminal of the at least one battery cell. The switched terminal of the fifth contactor and the switched terminal of the second contactor are electrically coupled.

In some embodiments, the battery enclosure comprises a first load terminal and a second load terminal located on an exterior of the battery enclosure. The first load terminal is electrically coupled to the switched terminal of the first contactor and the second load terminal is electrically coupled to the switched terminal of the second contactor. In some embodiments, the first load terminal and the second load terminal are physically separated by at least the threshold distance.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DESCRIPTION

Battery systems in electrical vehicles are often configured to deliver both high current and high voltage to a load, such as at least one motor. An electrical short can cause significant damage to both the battery system and/or a load attached to the battery system, and could create a safety risk to people near the battery system. In view of the foregoing, it would be advantageous to provide an improved high power battery system for an electric vehicle that minimizes the risk of an electrical short caused by a vehicle crash.

Accordingly, the battery enclosure described herein provides improved isolation between a positively charged unswitched terminal of a high power battery and a negatively charged unswitched terminal of the high power battery. Specifically, the battery enclosure described herein maintains at least a minimum physical separation between a first contactor electrically coupled to a positive unswitched terminal of the battery and a second contactor electrically coupled to a negative unswitched terminal of the battery. Additionally, the battery enclosure described herein optimally utilizes the space of the enclosure by arranging the battery components (e.g., unswitched terminals), and protection and disconnect components (e.g., the contactors, fuses, etc.) in an area of the enclosure that could otherwise not be occupied by a battery module.

In some embodiments, the high power battery comprises a plurality of battery cells. For example, the battery may comprise several lithium-ion battery cells wired in series and in parallel via a busbar. In some embodiments, groups of battery cells are arranged and electrically coupled in a specific manner (e.g., arranged to create a same voltage potential, physical arrangement of lithium-ion cells, packaging, etc.) forming a battery module. The battery may comprise a plurality of battery modules wired in series (e.g., forming a battery with an electrical potential of greater than 300 V). In some embodiments, the battery modules may be shaped as a rectangular prism. The battery may be located within the battery enclosure described herein.

Figure 1:
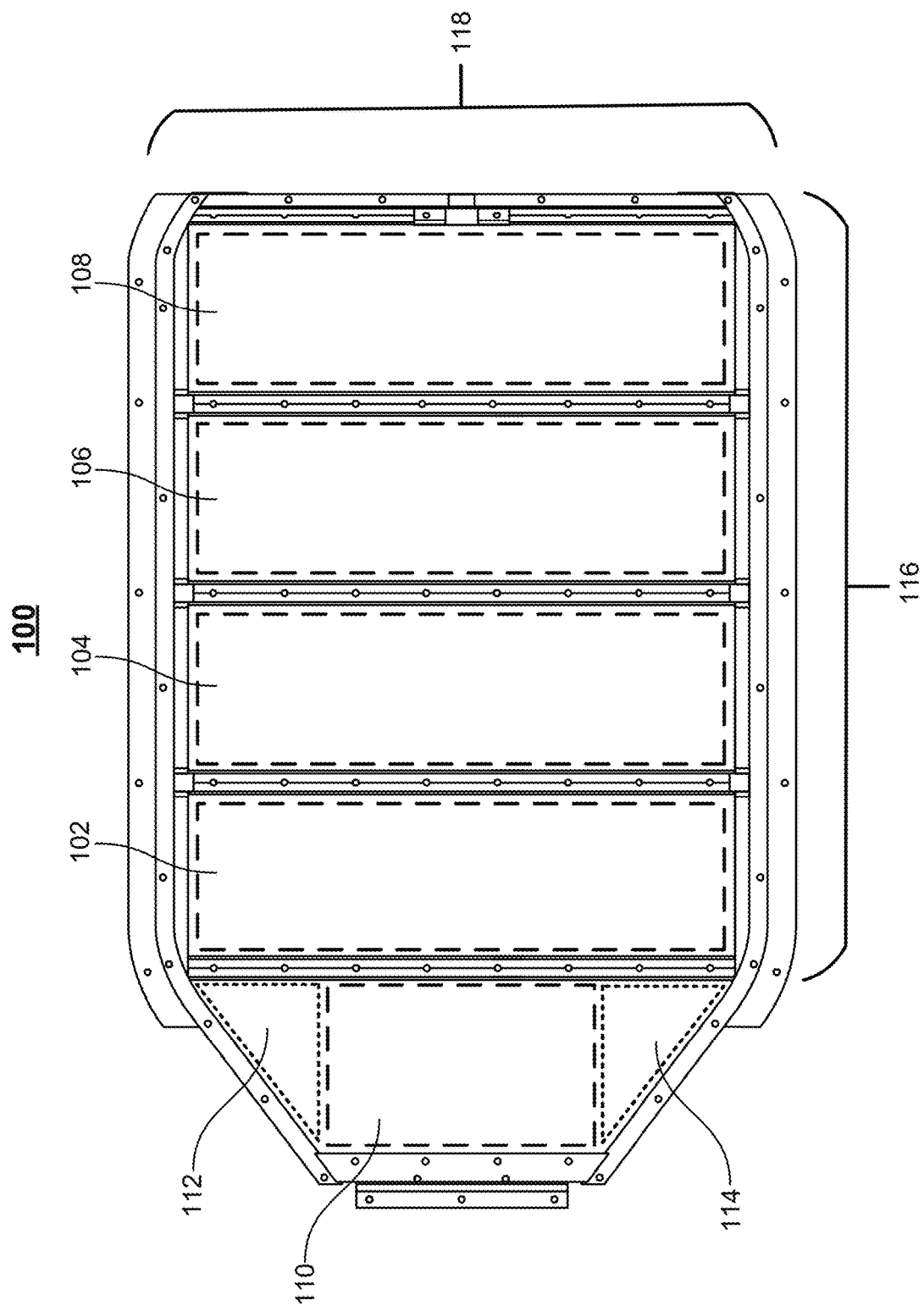
FIG. 1 shows an exemplary battery enclosure, in accordance with some embodiments of the present disclosure.

FIG. 1 depicts an exemplary battery enclosure that minimizes the risk of a short circuit between two unswitched terminals of a battery. Battery enclosure 100 is depicted having a plurality of regions (e.g., regions 102, 104, 106, 108, 110, 112, and 114). In some embodiments, the regions contain electrical components such as battery modules, battery cells, busbars, contactors, fuses, etc. As depicted in FIG. 1, battery modules may be located in a subset of the plurality of regions, such as in regions 102, 104, 106, 108, and 110. Although battery enclosure 100 is depicted having five regions comprising battery modules, battery enclosure 100 can have any number of regions comprising battery modules. Additionally, the size, shape, and orientation of the battery module regions may vary from those depicted in FIG. 1 without departing from the scope of this disclosure.

In some embodiments, a first dimension of battery enclosure 100 (e.g., dimension 116) may be sized such that the first dimension is smaller than a wheelbase of the electric vehicle. In such embodiments, a second dimension of battery enclosure 100 (e.g., dimension 118) may be sized such that the second dimension is less than the track of the electric vehicle.

In some embodiments, to maximize a number of components that can be placed in battery enclosure 100, and to minimize potential damage to battery enclosure 100 during a crash, battery enclosure 100 may comprise a front and/or rear acute trapezoidal region. The trapezoidal region(s) may be located near the front or rear wheels of the car. FIG. 1 depicts a single trapezoidal region on a leftmost side of battery enclosure 100 comprising regions 110, 112, and 114. In some embodiments, the trapezoidal region comprises one or more battery modules, contactors, busbars, fuses, etc.

A base of the trapezoidal region (e.g., regions 110, 112, and 114) may be the size of the second dimension (e.g., dimension 118) and may be located adjacent to battery module regions 102, 104, 106, and 108. The legs of the trapezoidal region may be slanted such that a frontal or rear crash will cause wheels of the electric vehicle to be deflected outward and away from battery modules located in regions 102, 104, 106, 108 and 110 during the crash.

In some embodiments, due to the rectangular shape of the battery modules, two triangular regions of the battery enclosure, depicted as regions 112 and 114, are unoccupied by battery cells. In some embodiments, battery enclosure 100 comprises the circuit and battery protection components (e.g., contactors, fuses, busbars carrying switched and unswitched power, etc.) in the triangular regions (e.g., regions 112 and 114). Battery enclosure 100 may comprise components that are electrically coupled to a positive unswitched terminal of the battery (e.g., the battery comprising modules located in regions 102, 104, 106, 108, and/or 110) in a first triangular region (e.g., region 112) and may comprise components that are electrically coupled to a negative unswitched terminal of the battery in a second triangular region (e.g., region 114). Because region 112 contains the positively charged unswitched power components and region 114 contains the negatively charged unswitched power components, and because regions 112 and 114 are located at least a minimum distance away from each other, the risk of a short circuit during a crash is minimized. For example, the triangular regions may be physically separated from the negative terminal contactors by at least a threshold distance (e.g., 300 mm, 450 mm, 600 mm, 750 mm, 900 mm, 1050 mm, 1200 mm, 1350 mm, 1500 mm, 1650 mm, 1800 mm, etc.). The physical distance between regions 112 and 114 may be determined as a function of the size of the battery enclosure and/or as a function of the size of the track and/or wheelbase of the car. In some embodiments, where battery enclosure 100 comprises two trapezoidal regions (e.g., one located on a leftmost side of battery enclosure 100 and the other on a rightmost side of battery enclosure 100), the positively charged components and the negatively charged components may be located on opposite sides of the battery enclosure.

In some embodiments, the threshold distance is based on the size of a battery module physically occupying the space between the first triangular region (e.g., region 112) and the second triangular region (e.g., region 114). Although the disclosure herein describes the placement of components in a triangular region (e.g., regions 112 and 114), the shape, size, and location of the region may vary without departing from the scope of the disclosure, so long as a location of the unswitched positive terminal and a location of the unswitched negative terminal are at least a minimum distance from each other. For example, the region may be square-shaped, round-shaped, oval, etc. In some embodiments, the location, size, and shape of the region are determined based on the available space in a battery enclosure that cannot be occupied by battery modules. In some embodiments, the regions may overlap, so long as a distance between the unswitched positive terminal and unswitched negative terminal is maintained. In some embodiments, the regions are located on opposite sides of the battery enclosure (e.g., a rightmost side of battery enclosure 100 and a leftmost side of battery enclosure 100).

Figure 2:
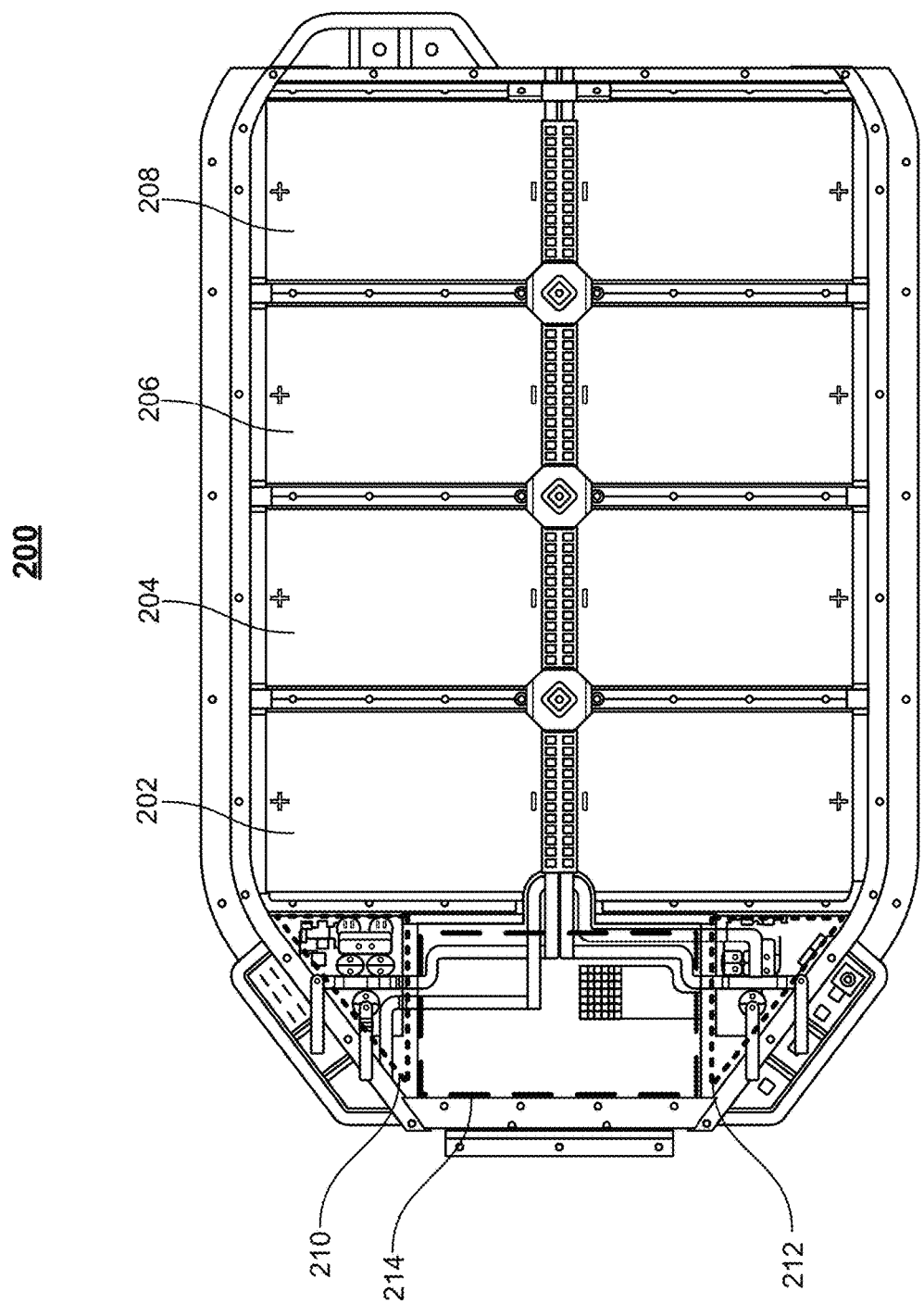
FIG. 2 shows an additional depiction of an exemplary battery enclosure, in accordance with some embodiments of the present disclosure.

FIG. 2 is an additional depiction of an exemplary battery enclosure in accordance with some embodiments of the present disclosure. Battery enclosure 200 is depicted having a plurality of battery modules (e.g., battery modules 202, 204, 206, and 208), contactors, busbars, and fuses. The battery modules 202, 204, 206 and 208 are connected in series to form a high power battery (e.g., having a voltage of greater than 300V and able to deliver high current). In some embodiments, the circuit and protection components for the battery (e.g., busbars, contactors, fuses, etc.) are located in a triangular region (e.g., regions 210 and 212 corresponding to regions 112 and 114 in FIG. 1). In battery enclosure 200, region 214 (corresponding to region 110 of battery enclosure 100) is depicted having a plurality of fuses (e.g., fuses configured for a voltage lower than that of the high power battery, such as 12V). In some embodiments, region 214 includes a battery module, such as one of battery modules 202, 204, 206, and 208.

In some embodiments, battery enclosures 100 and 200 comprise a plurality of contactors, a plurality of busbars, and at least one fuse. For example, the battery enclosure may comprise at least one positive terminal contactor and at least one negative terminal contactor, each comprising an unswitched terminal and a switched terminal. The unswitched terminal of the positive terminal contactor may be electrically coupled to the positive terminal of the battery and the unswitched terminal of the negative terminal contactor may be electrically coupled to the negative terminal of the battery. In some embodiments, a fuse may be connected between the unswitched terminals of the contactors and the terminals of the battery. The at least one fuse may comprise a first fuse terminal and a second fuse terminal. The first fuse terminal may be electrically coupled (e.g., via a first busbar) to a positively charged terminal of the battery. The second fuse terminal may be electrically coupled to the unswitched terminal of the positive terminal contactor (e.g., via a second busbar). The unswitched terminal of the negative terminal contactor may be electrically coupled to the negative terminal of the battery (e.g., via a third busbar).

In some embodiments, the positive terminal contactor and the negative terminal contactor are located at least a threshold distance from each other (e.g., 300 mm, 450 mm, 600 mm, 750 mm, 900 mm, 1050 mm, 1200 mm, 1350 mm, 1500 mm, 1650 mm, 1800 mm, etc.). Because of the physical separation between the positive and negative terminal contactors (and thereby the components electrically coupled to the positive terminal of the battery and the components electrically coupled to the negative terminal of the battery), the risk of a crash causing a short between the positive and negative unswitched terminals of the battery (e.g., the battery formed by modules 202, 204, 206, and 208) is minimized with respect to enclosures having the positive and negative unswitched terminals in close proximity.

In the exemplary embodiments depicted in FIGS. 1 and 2, the positive terminal contactor is located in a first triangular region (e.g., regions 112 and 210) and the negative terminal contactor is located in a second triangular region (e.g., regions 114 and 212). In some embodiments, the first triangular region and the second triangular region are separated by a battery module (e.g., a battery module in region 110 or 214). The triangular regions (e.g., regions 112, 114, 210, and 212) may not be perfect triangles and instead may be substantially triangle shaped. For example, the corners of the triangular region may be truncated resulting in a region that has six sides and is shaped as a triangle with truncated sides. In some embodiments, the regions for the circuit and battery protection components are chosen such that the components occupy space in the battery enclosure that cannot be occupied by a battery module (e.g., due to the shape, size, orientation, etc., of the region or battery module). In such embodiments, the shape and size of the regions may vary from that of a triangle and may be determined based on the size and shape of the circuit protection components.

In some embodiments, the positive terminal of the battery may be electrically coupled to multiple parallel paths comprising a fuse in series with a contactor. For example, a first fuse and a first positive terminal contactor may be electrically coupled in parallel to a second fuse and second positive terminal contactor. For example, a first fuse terminal of the second fuse and the first fuse terminal of the first fuse may be electrically coupled in parallel with the positive unswitched terminal of the battery. The second fuse terminal of the second fuse may be electrically coupled to an unswitched terminal of a second positive terminal contactor. A switched terminal of the second positive terminal contactor may be coupled in parallel (e.g., via a busbar) to the switched terminal of the first positive terminal contactor. In some embodiments, the dual fuse and dual contactor configuration discussed above may be arranged to fit within the triangle-shaped regions (e.g., regions 112, 114, 210, and 212) of battery enclosures 100 and 200. Although a dual fuse dual contactor arrangement is discussed above, additional contactors and fuses may be arranged without departing from the scope of the invention. An exemplary wiring of the contactors, fuses, and battery modules is discussed further below, in relation to FIGS. 4-5.

In some embodiments, the busbar electrically coupling the switched terminal of the first positive terminal contactor and the switched terminal of the second positive terminal contactor may additionally be electrically coupled to a load (e.g., a positive terminal of at least one electric motor of an electric vehicle) located external to the battery enclosure. In some embodiments the load substantially comprises at least one motor of an electric vehicle. For example, at least half of the total current driven by the battery may be directed to one or more electric motors of the electric vehicle.

Figure 3:
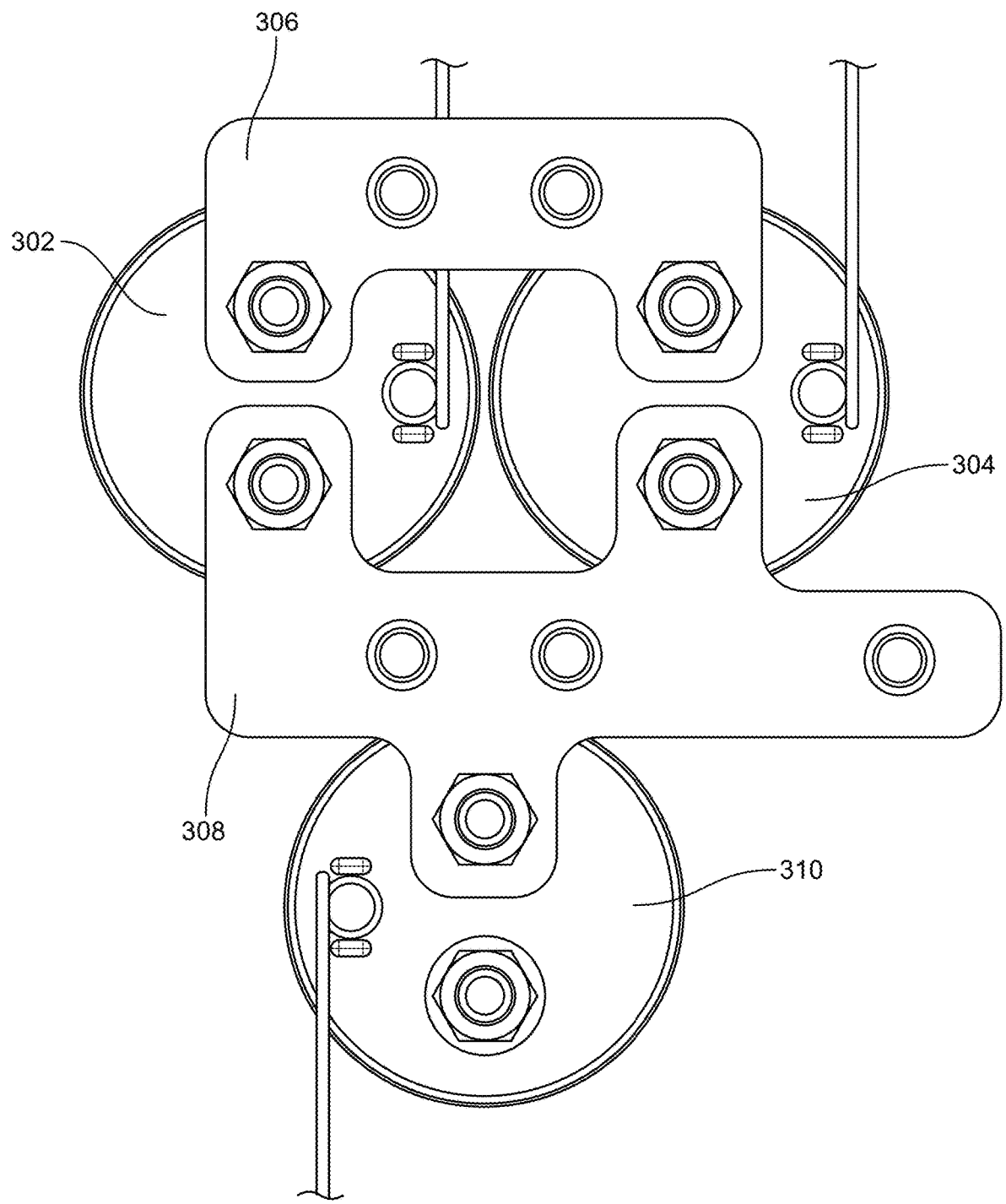
FIG. 3 shows an exemplary arrangement of contactors in a battery enclosure, in accordance with some embodiments of the present disclosure.

FIG. 3 depicts exemplary arrangement 300 of contactors in accordance with some embodiments of the present disclosure. The contactors depicted in FIG. 3 may be located in the triangle shaped region (e.g., regions 112, 114, 210, and 212) of the battery enclosures 100 and 200. Arrangement 300 depicts a first contactor (e.g., contactor 302) electrically coupled in parallel to a second contactor (e.g., contactor 304) via a busbar (e.g., busbar 306). For example, a terminal of the battery (e.g., the battery formed by a series connection of modules 202, 204, 206 and 208) may be electrically coupled to busbar 306. Busbar 306 may be electrically coupled in parallel to an unswitched terminal of the first contactor (e.g., contactor 302) and an unswitched terminal of the second contactor (e.g., contactor 304). In some embodiments, a switched terminal of the first contactor (e.g., contactor 302) and the second contactor (e.g., contactor 304) may be electrically coupled in parallel (e.g., via busbar 308) to a load located external to the battery enclosure (e.g., a terminal of an electric motor). In some embodiments, the load is electrically coupled via a positively charged load terminal and a negatively charged load terminal located on an exterior of the battery enclosure. In some embodiments, the positively charged load terminal and the negatively charged load terminal are located at least the threshold distance from each other. In some embodiments, a contactor control module is configured to control electrical connectivity between the unswitched terminal of the contactor and the switched terminal of the contactor. Although arrangement 300 is depicted having two contactors in parallel connected to the battery terminal, any number of contactors may be connected to the battery terminal (e.g., one contactor) without departing from the scope of this disclosure.

In some embodiments, the parallel combination of contactors (e.g., contactors 302 and 304) is used to reduce a disconnection time between the battery and the load. In particular, upon detecting an overcurrent event that is below a threshold current, the contactor control module may open both of the contactors in the parallel combination (e.g., contactors 302 and 304). In such embodiments, the threshold current is selected such that the disconnect time for the contactors is quicker than a blow time of the fuses and switching under load does not damage the contactors. In another example, when the overcurrent event exceeds a threshold current, the contactor control module may open one contactor in the parallel combination of contactors, thereby increasing the current across a single fuse and reducing the disconnect time from the battery module.

Although FIG. 3 is depicted having three contactors, any number of contactors and any type of electrically controlled switch may be used (e.g., a relay). In some embodiments, the battery enclosure comprises a plurality of contactors configured to control charging of the battery (e.g., contactor 310). For example, the battery enclosure (e.g., battery enclosure 100 and 200) may comprise a first charging contactor configured to enable charging of the battery via the positively charged terminal of the battery and a second charging contactor configured to enable charging of the battery via the negatively charged terminal of the battery. A first terminal of the first charging contactor may be electrically coupled to the switched terminal of the positive terminal contactors. A first terminal of the second charging contactor may be electrically coupled to the switched terminal of the negative terminal contactors. For example, contactor 310 may be electrically coupled to one or more contactors (e.g., contactors 302 and 304) via a busbar (e.g., busbar 308).

In some embodiments, a second terminal of the charging contactor (e.g., contactor 310) may be electrically coupled (e.g., via a busbar) to a positive or negative terminal of a charging port located external to the battery enclosure. In some embodiments, a first charging contactor, electrically coupled to a negative terminal of the battery, and a second charging contactor, electrically coupled to a positive terminal of the battery, are located in different, physically separate, regions of the battery module. For example, the first charging contactor may be located in region 112 of battery enclosure 100 or region 210 of battery enclosure 200. The second charging contactor may be located in region 114 of battery enclosure 100 or region 212 of battery enclosure 200.

In some embodiments, a contactor control module (e.g., contactor control module 402 or 502 discussed further below, in relation to FIGS. 4 and 5, respectively) is configured to control a state (e.g., open or closed) of the contactors. For example, based on detecting a charger connected at the charging port, the contactor control module may set a state of the first and second charging contactors (e.g., contactor 310) to a closed state. Upon detecting that the charger is no longer connected at the charging port, the contactor control module may set the state of the first and second charging contactors (e.g., contactor 310) to an open state. In another example, the contactor control module may control one or more contactors in parallel. For example, the contactor control module may set a state of contactor 302 and contactor 304 to a closed state when the contactor control module is instructed to provide battery power to the electric vehicle. In contrast, the contactor control module may set a state of contactor 302 and contactor 304 to an open state when the contactor control module is instructed to disconnect battery power to the electric vehicle.

Figure 4:
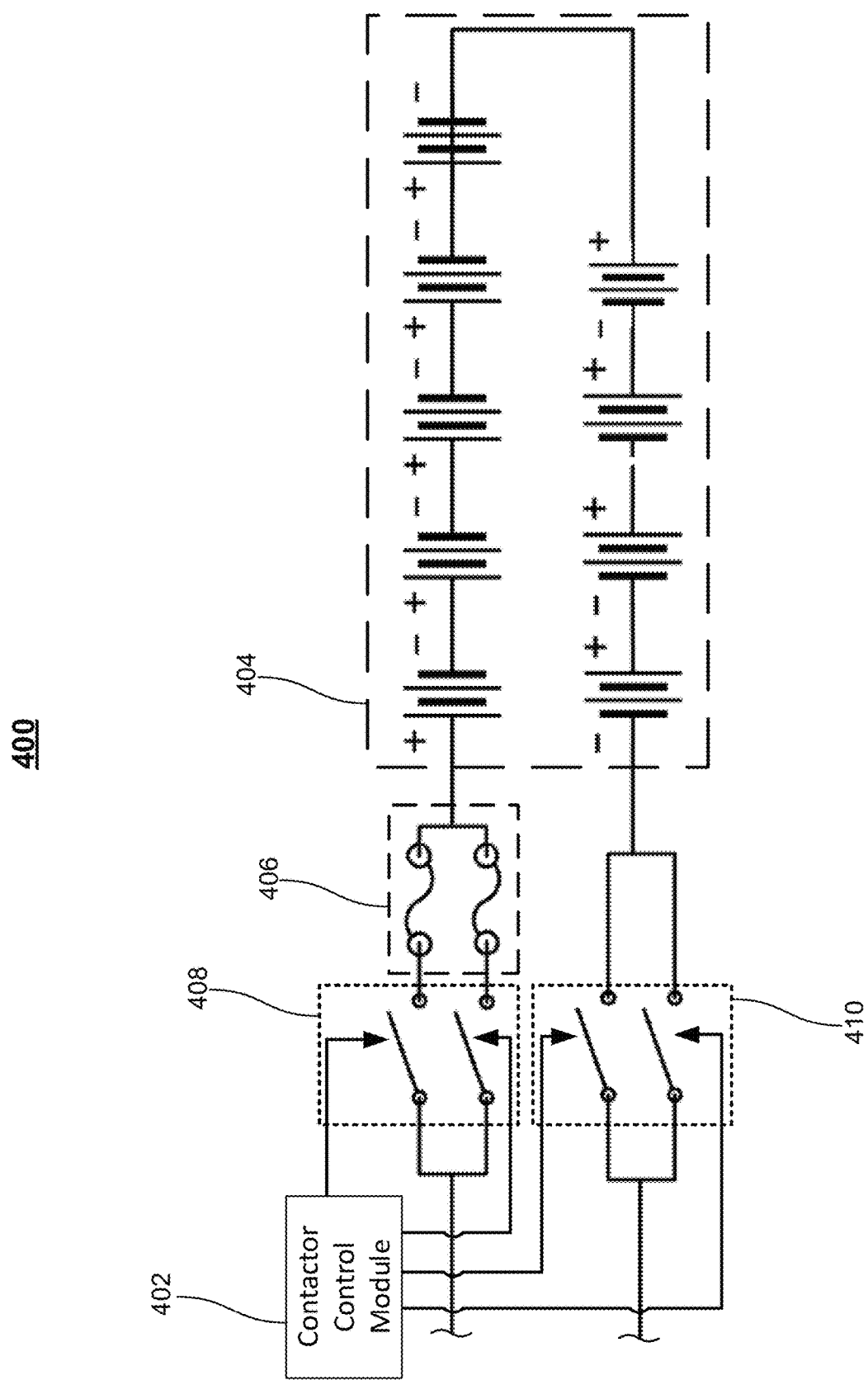
FIG. 4 shows a configuration of contactors, fuses, and battery cells, in accordance with some embodiments of the present disclosure.

FIG. 4 depicts a configuration of contactors, fuses and battery cells in accordance with some embodiments of the present disclosure. Arrangement 400 depicts a plurality of contactors (e.g., positive terminal contactors 408 and negative terminal contactors 410), fuses 406 and battery 404. In some embodiments, an opened or closed state of the plurality of contactors is controlled by contactor control module 402. In some embodiments, the contactors depicted in FIG. 4 (e.g., positive terminal contactors 408 or negative terminal contactors 410) may be arranged as depicted in FIG. 3. For example, positive terminal contactors 408 may be configured as contactors 302 and 304, and/or negative terminal contactors 410 may be configured as contactors 302 and 304. In such embodiments, contactors 302 and 304 may be electrically coupled to respective fuses instead of busbar 306.

Battery 404 is depicted having a plurality of battery cells/modules (e.g., modules 202, 204, 206, and 208 of FIG. 2) connected in series. In some embodiments, the one or more contactors are electrically coupled to the battery terminal via a fuse. As depicted in arrangement 400, a positive terminal of battery 404 is electrically coupled in parallel to two fuses (e.g., fuses 406). Each of fuses 406 may be electrically coupled to a respective contactor (e.g., a respective one of positive terminal contactors 408) via a respective unswitched terminal of positive terminal contactors 408. In some embodiments, fuses 406 are electrically coupled to positive terminal contactors 408 via a busbar. In some embodiments, the switched terminals of the positive terminal contactors may additionally be electrically coupled to a positive terminal of a load (e.g., an electric motor external to the battery enclosure) or a positive terminal of a charging contactor (e.g., contactor 310 via busbar 308).

In arrangement 400, a negative terminal of battery 404 is electrically coupled to negative terminal contactors 410 (e.g., via a busbar 306 electrically coupling the unswitched terminals of the negative terminal contactors in parallel). The switched terminals of negative terminal contactors 410 may be electrically coupled in parallel (e.g., via busbar 308). In some embodiments, the switched terminals of the negative terminal contactors may be electrically coupled to a negative terminal of a load (e.g., an electric motor) or a negative terminal of a charging contactor (e.g., contactor 310 via busbar 308).

Although the parallel combination of fuses and contactors is discussed above and depicted in FIG. 4 with respect to a connection to a positive terminal of the battery, an equivalent combination of parallel fuses and contactors may be coupled to a negative terminal of the battery.

Figure 5:
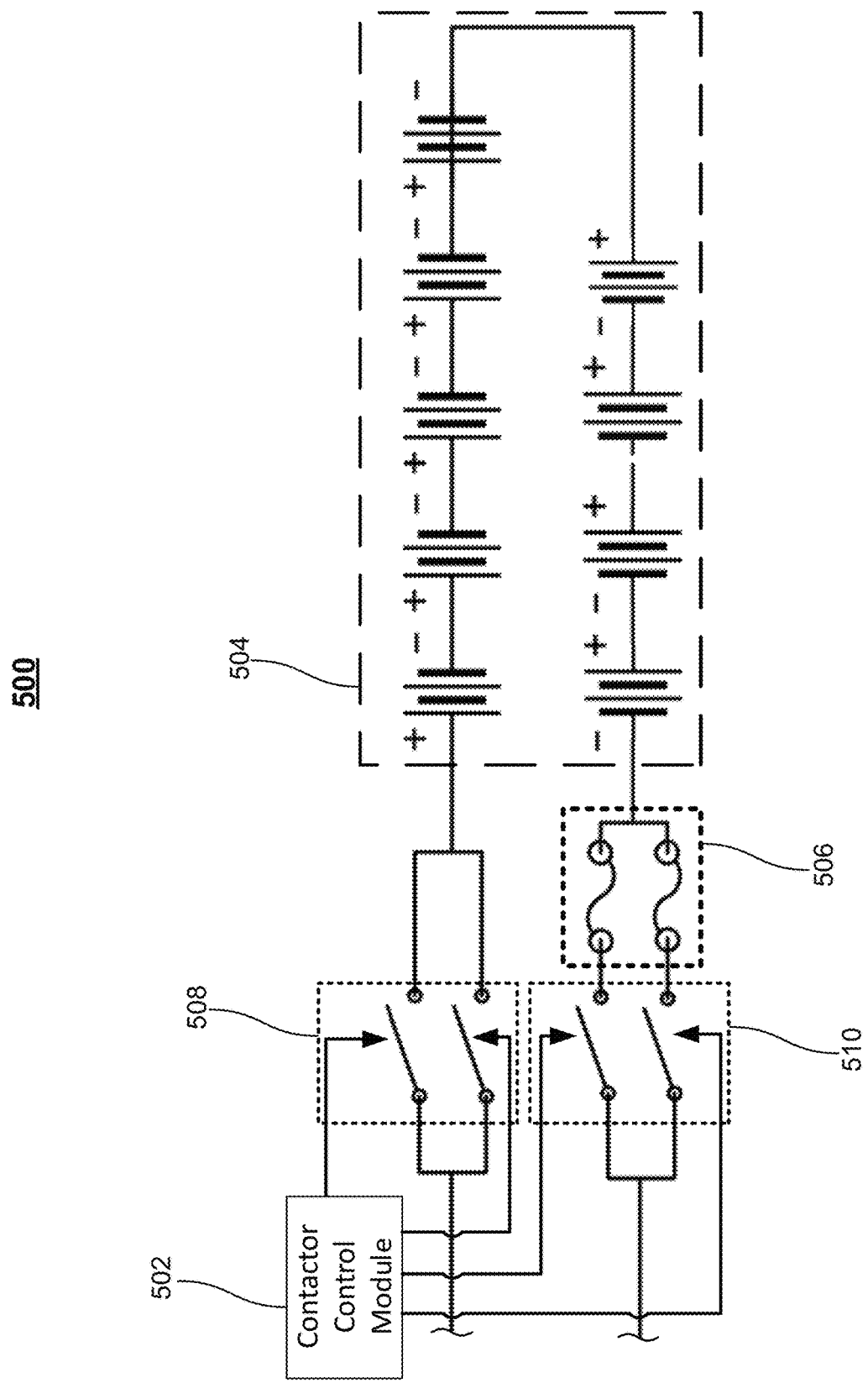
FIG. 5 shows an additional configuration of contactors, fuses, and battery cells, in accordance with some embodiments of the present disclosure.

FIG. 5 depicts an additional configuration of contactors, fuses and battery cells in accordance with some embodiments of the present disclosure. In arrangement 500, the parallel combination of fuses (e.g., fuses 506) is depicted having a connection to a negative terminal of battery 504. The plurality of contactors (e.g., positive terminal contactors 508 and negative terminal contactors 510) may be arranged as depicted in FIG. 3. For example, positive terminal contactors 508 may be configured as contactors 302 and 304, and/or negative terminal contactors 510 may be configured as contactors 302 and 304. In some embodiments, an opened or closed state of the plurality of contactors is controlled by contactor control module 502.

Battery 504 is depicted having a plurality of battery cells/modules (e.g., modules 202, 204, 206, and 208 of FIG. 2) connected in series. A negative terminal of battery 504 is electrically coupled in parallel to two fuses (e.g., fuses 506). In some embodiments, a first terminal of fuses 506 is electrically coupled to battery 504 via a busbar. A second terminal of each of fuses 506 may be electrically coupled to a respective unswitched terminal of negative terminal contactors 510. The switched terminals of negative terminal contactors 510 may be electrically coupled in parallel (e.g., via busbar 308 depicted in FIG. 3). In some embodiments, the switched terminals of negative terminal contactors 510 may additionally be electrically coupled to a negative terminal of a load (e.g., an electric motor external to the battery enclosure) or a negative terminal of a charging contactor (e.g., contactor 310).

In arrangement 500, a positive terminal of battery 504 is electrically coupled to positive terminal contactors 508 (e.g., via a busbar 306 electrically coupling the unswitched terminals of the positive terminal contactors in parallel). The switched terminals of positive terminal contactors 510 may be electrically coupled in parallel (e.g., via busbar 308). In some embodiments, the switched terminals of the negative terminal contactors may be electrically coupled to a negative terminal of a load (e.g., an electric motor) or a negative terminal of a charging contactor (e.g., contactor 310).

In some embodiments, the components depicted in arrangements 400 and 500 are located in a battery enclosure, such as battery enclosures 100 or 200. In some embodiments, positive terminal contactors 408 and fuses 406 may be located in a first region of the battery enclosure (e.g., regions 112 or 210), and negative terminal contactors 410 may be located in a second region of the battery enclosure (e.g., regions 114 or 212). In other embodiments positive terminal contactors 508 may be located in a first region of the battery enclosure (e.g., regions 112 or 210), and negative terminal contactors 510 and fuses 506 may be located in a second region of the battery enclosure (e.g., regions 114 or 212). In both embodiments, the positive terminal contactors may be physically separated from the negative terminal contactors by at least a threshold distance (e.g., 300 mm, 450 mm, 600 mm, 750 mm, 900 mm, 1050 mm, 1200 mm, 1350 mm, 1500 mm, 1650 mm, 1800 mm, etc.). In some embodiments, the first region (e.g., regions 112 or 210) may be physically separated from the second region (e.g., regions 114 or 212) by a battery module located between the first region and the second region. In this example, the distance between the first region and the second region (and therefore the at least one negative terminal contactor and the at least one positive terminal contactor) may be based on the size of the battery module.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A system comprising:
   a battery module comprising an unswitched terminal;
   a first and a second contactor, each comprising a respective first contactor terminal and a second contactor terminal; wherein:
   the unswitched terminal of the battery module is electrically coupled to the first contactor terminal of the first contactor;
   the second contactor terminal of the first contactor is electrically coupled to
   the first contactor terminal of the second contactor; and
   the second contactor terminal of the second contactor is electrically coupled to a charging port.

2. The system of claim 1, wherein the battery module, the first contactor, and the second contactor are located within a battery enclosure of an electric vehicle.

3. The system of claim 1, further comprising:
   a fuse, wherein the unswitched terminal of the battery module is electrically coupled to the first contactor terminal of the first contactor via the fuse.

4. The system of claim 1, wherein the unswitched terminal of the battery module is a first unswitched terminal of the battery module, and wherein the battery module further comprises a second unswitched terminal, the system further comprising:
   a third contactor comprising a first contactor terminal, wherein:
   the first contactor terminal of the third contactor is electrically coupled to the second unswitched terminal of the battery module.

5. The system of claim 4, wherein the third contactor further comprises a second contactor terminal, and wherein the charging port comprises a first charging terminal and a second charging terminal, the system further comprising:
   an additional contactor comprising a first contactor terminal and a second contactor terminal, wherein:
   the first contactor terminal of the additional contactor is electrically coupled to the second contactor terminal of the third contactor;
   the second contactor terminal of the additional contactor is electrically coupled to the second charging terminal of the charging port; and
   the second contactor terminal of the second contactor is electrically coupled to the first charging terminal of the charging port.

6. The system of claim 4, wherein the first contactor and the third contactor are physically separated within a battery enclosure of an electric vehicle, wherein an extent of the physical separation is determined based on a track of the electric vehicle.

7. The system of claim 6, wherein the battery module is one of a plurality of battery modules in a battery pack.

8. The system of claim 1, wherein the unswitched terminal of the battery module is of positive polarity.

9. The system of claim 1, further comprising:
an additional contactor, comprising a first contactor terminal and a second contactor terminal, wherein:
the first contactor terminal of the additional contactor is electrically coupled to the unswitched terminal of the battery module; and
the second contactor terminal of the additional contactor is electrically coupled to the first contactor terminal of the second contactor.

10. The system of claim 1, wherein the second contactor terminal of the first contactor is electrically coupled to the first contactor terminal of the second contactor via a busbar.

11. The system of claim 1, further comprising a contactor control module configured to control a state of the first contactor.

12. The system of claim 11, wherein the contactor control module is configured to control a state of the second contactor based on detecting an input at the charging port.

13. The system of claim 1, wherein the second contactor terminal of the first contactor is electrically coupled to a load.

14. The system of claim 13, wherein the load comprises a motor of an electric vehicle.

15. The system of claim 1, wherein the battery module comprises a plurality of battery cells.

16. The system of claim 15, wherein the plurality of battery cells are electrically coupled in series within the battery module.

17. A system comprising:
a battery enclosure;
one or more battery modules;
a charging port;
a first and a second contactor, wherein:
the one or more battery modules are electrically coupled in series to the first contactor;
the first contactor is electrically coupled in series with the second contactor; and
the second contactor is electrically coupled in series with the charging port.

18. A method of manufacturing, the method comprising:
providing a first and a second contactor comprising a respective first contactor terminal and a second contactor terminal;
providing a battery module comprising an unswitched terminal;
providing a charging port; and
electrically coupling:
the unswitched terminal of the battery module to the first contactor terminal of the first contactor,
the second contactor terminal of the first contactor to the first contactor terminal of the second contactor; and
the second contactor terminal of the second contactor to the charging port.

19. The method of manufacturing of claim 18, wherein the unswitched terminal of the battery module is a first unswitched terminal and wherein the battery module comprises a second unswitched terminal, the method further comprising:
providing a third contactor comprising a first contactor terminal; and
electrically coupling the first contactor terminal of the third contactor to the second unswitched terminal of the battery module.

20. The method of manufacturing of claim 19, wherein the third contactor comprises a second contactor terminal, the method further comprising:
providing a load comprising a first load terminal and a second load terminal; and
electrically coupling:
the first load terminal to the second contactor terminal of the first contactor; and
the second load terminal to the second contactor terminal of the third second contactor.

* * * * *